United States Patent
Liu et al.

(10) Patent No.: US 8,126,040 B2
(45) Date of Patent: Feb. 28, 2012

(54) DEVICE AND METHOD FOR CALIBRATING MIMO SYSTEMS

(75) Inventors: Jian Liu, Noisy le Roi (FR); Gerd Vandersteen, Sint-Pieters-Leeuw (BE)

(73) Assignees: IMEC, Leuven (BE); Samsung Electronics Co., Ltd., Suwon (KR)

( * ) Notice: Subject to any disclaimer, the term of this patent is extended or adjusted under 35 U.S.C. 154(b) by 799 days.

(21) Appl. No.: 12/128,557

(22) Filed: May 28, 2008

(65) Prior Publication Data

US 2008/0285637 A1    Nov. 20, 2008

Related U.S. Application Data

(63) Continuation of application No. PCT/BE2006/000127, filed on Nov. 28, 2006.

(30) Foreign Application Priority Data

Nov. 29, 2005 (EP) ................................. 05447263

(51) Int. Cl.
*H04B 3/46* (2006.01)
(52) U.S. Cl. ......................... 375/224; 375/347
(58) Field of Classification Search .................. 375/224, 375/130, 347, 349; 455/67.11, 73, 562.1
See application file for complete search history.

(56) References Cited

U.S. PATENT DOCUMENTS

| | | |
|---|---|---|
| 2005/0047384 A1 | 3/2005 | Wax et al. |
| 2006/0094373 A1* | 5/2006 | Hottinen .......................... 455/73 |
| 2006/0229029 A1* | 10/2006 | Waltho et al. ................... 455/73 |
| 2007/0054633 A1* | 3/2007 | Piirainen ..................... 455/115.3 |

FOREIGN PATENT DOCUMENTS

| | | |
|---|---|---|
| EP | 1 392 004 A2 | 2/2004 |
| EP | 1 496 567 A1 | 1/2005 |
| WO | WO 2004 039022 A2 | 5/2004 |

OTHER PUBLICATIONS

Liu, et al., OFDM-MIMO WLAN AP Front-end Gain and Phase Mismatch Calibration, Proceedings of IEEE RAWCON, Sep. 2004; p. 151-154.
International Search Report and Written Opinion dated Feb. 1, 2007, for International Application No. PCT/BE2006/000127.

* cited by examiner

*Primary Examiner* — Khai Tran
(74) *Attorney, Agent, or Firm* — Knobbe Martens Olson & Bear LLP

(57) ABSTRACT

A device and method for calibrating MIMO systems are disclosed. In one aspect, a calibration circuit comprises at least a first and a second input/output port, each arranged for being connected to a different transmitter/receiver pair of a multiple input multiple output (MIMO) system. The circuit further comprises at least a third and a fourth input/output port, each arranged for being connected to a different antenna. The circuit further comprises an attenuator having a first attenuator port and a second attenuator port. The circuit further comprises a first and a second non-reciprocal switch, the first switch being arranged for establishing a connection between the first input/output port and either the third input/output port or the first attenuator port, and the second switch arranged for establishing a connection between the second input/output port and either the fourth input/output port or the second attenuator port.

12 Claims, 4 Drawing Sheets

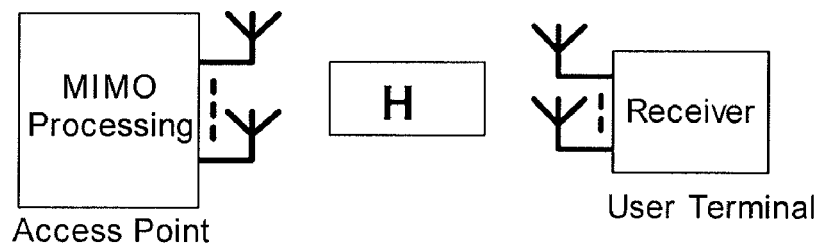
Fig.1 - PRIOR ART
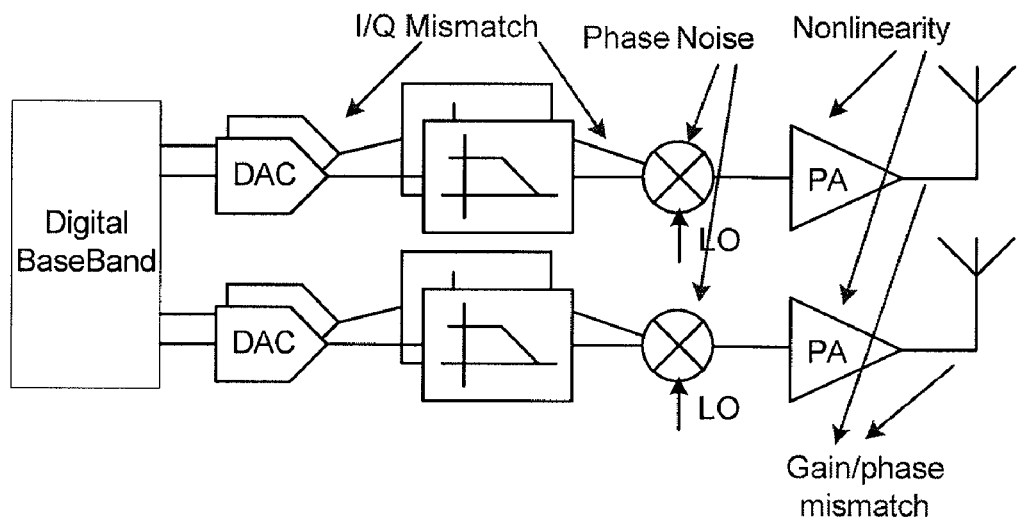
Fig.2 - PRIOR ART
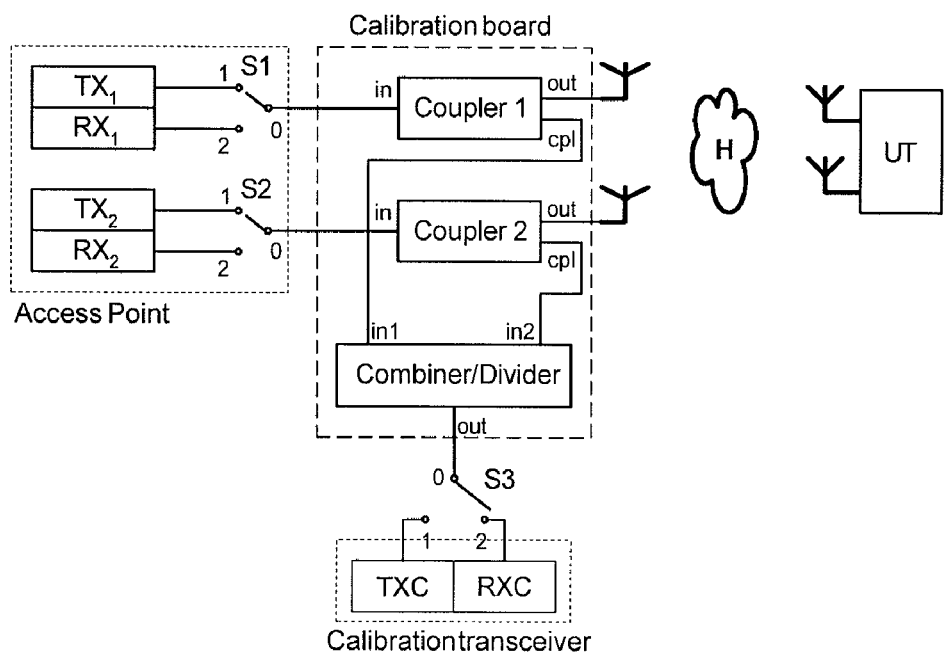
Fig.3 - PRIOR ART

DEVICE AND METHOD FOR CALIBRATING MIMO SYSTEMS

CROSS REFERENCE TO RELATED APPLICATIONS

This application is a continuation of PCT Application No. PCT/BE2006/000127, filed Nov. 28, 2006, which is incorporated by reference hereby in its entirety.

BACKGROUND OF THE INVENTION

1. Field of the Invention

The present invention relates to a method and device for the calibration of MIMO systems.

2. Description of the Related Technology

In the following description multiple-input multiple output (MIMO) systems are considered, i.e. multiple antenna wireless communication systems with multiple antennas at both sides of the link.

FIG. 1 shows the considered application context, namely for single-user MIMO downlink. When implementing such systems in practice, system designers are very much concerned with analogue front-end impairments. The complete channel to be taken into account is composed not only of the propagation channel, but also of the multiple antenna analogue transceiver front-ends. As an example, FIG. 2 shows some non-ideal effects in a multi-antenna transmitter front-end that can have a detrimental impact on the end-to-end performance. The gain/phase mismatch between multiple antenna transmitters (TXs) or multiple antenna receivers (RXs) is a MIMO specific analogue front-end impairment.

Downlink channel knowledge (channel state information (CSI)) is required at the access point (AP) transmitter both for MIMO with transmit processing and MIMO with joint transmit/receive processing. For time-division-duplex (TDD) wireless systems, one way to acquire this downlink channel knowledge is to apply a so-called feedback approach: the AP transmits a known preamble to the user terminal, the downlink CSI is extracted at the user terminal side and subsequently retransmitted to the access point over the uplink. It is clear this approach involves a big overhead, which kills the capacity gain.

An alternative is the reciprocal approach, where the transpose of the estimated uplink CSI is used as an approximation of the downlink CSI and applied into the transmit processing. The reciprocal approach minimizes the overhead caused by acquiring the downlink CSI in the AP. For a reciprocal approach, the received signal vector $\hat{x}$ at the user terminal (UT) can be written as (for transmit Zero-Forcing)

$$\hat{x} = \underbrace{D_{RX,UT} H D_{TX,AP}}_{H^{DL}} \cdot \underbrace{D_{RX,AP}^{-1} H^{-1} D_{TX,UT}^{-1}}_{F=(H^{UL})^{-T}} \cdot x + n \quad \text{(eq. 1)}$$

where H denotes the DL propagation channel and n the additive white Gaussian noise (AWGN). The diagonal components in diagonal matrix $D_{TX,AP}$ and $D_{RX,AP}$ are the transfer functions of the transmit (Tx) and receive (Rx) front-ends (FEs) at the access point (AP). To recover the data, the reciprocity of the AP analogue FEs is required, which is equivalent to $$D_{TX,AP} \cdot D_{RX,AP}^{-1} = \begin{bmatrix} \frac{TX_1}{RX_1} & 0 & \cdots & 0 \\ 0 & \frac{TX_2}{RX_2} & \cdots & 0 \\ \vdots & \vdots & \ddots & \vdots \\ 0 & 0 & \cdots & \frac{TX_{nT}}{RX_{nT}} \end{bmatrix} = \xi \cdot I \quad \text{(eq. 2)}$$

in which $\xi$ is a coefficient. The reciprocity requirement can be translated into $$\frac{TX_1}{RX_1} = \frac{TX_2}{RX_2} = \cdots = \frac{TX_{nT}}{RX_{nT}} = \xi \quad \text{(eq. 3)}$$

When there is AP Tx and/or Rx mismatch, the reciprocity of the complete channel is destroyed, which results in multi-stream-interference (MSI) and causes severe performance degradation. Hence, a calibration of the analogue front-ends of the MIMO system is needed to ensure the complete channel reciprocity. A calibration should yield coefficients $c_j$ of a calibrating matrix C, for which the calibration requirement can be written as $$c_1 \cdot \frac{TX_1}{RX_1} = c_2 \cdot \frac{TX_2}{RX_2} = \cdots = c_{n_T} \cdot \frac{TX_{n_T}}{RX_{n_T}} = \alpha \quad \text{(eq. 4)}$$

For matrix C one can write:

$$C = \begin{bmatrix} c_1 & \cdots & 0 \\ \vdots & \ddots & \vdots \\ 0 & \cdots & c_{n_T} \end{bmatrix} = \begin{bmatrix} \frac{RX_1}{TX_1} \cdot \alpha & \cdots & 0 \\ \vdots & \ddots & \vdots \\ 0 & \cdots & \frac{RX_{n_T}}{TX_{n_T}} \cdot \alpha \end{bmatrix} \quad \text{(eq. 5)}$$

In the paper 'OFDM-MIMO WLAN AP Front-end Gain and Phase Mismatch Calibration' J. Liu et al., *Proc. IEEE RAWCON*, September 2004, the calibration scheme as shown in FIG. 3 was presented. The scheme calibrates access point transceiver FE mismatches by using a pair of calibration TX and RX, plus the power directional couplers and the power combiner/divider on the calibration board. Although by implementation the scheme has proven to work in a stable and effective way, it suffers from the main drawback that it is not cost-effective from an implementation point of view, since it requires a calibration transceiver.

Another prior art calibration scheme is presented in WO2004/039022. The calibration is performed 'over the air', i.e. the complete channel transfer functions $H_{AP->UT}$ and $H_{UT->AP}$ are determined. Subsequently the following matrix formula is solved in order to derive the coefficients $K_A$ and $K_B$.

$$\hat{H}_{UT->AP} \cdot K_A = (\hat{H}_{AP->UT} K_B)^T \quad \text{(eq.5)}$$

Although no additional calibration hardware is needed, the calibration factor measurement involves a considerable overhead. In case the calibration needs to be redone frequently, the overhead will reduce the capacity.

In European patent application EP1392004-A2 a calibration method is disclosed for a wireless communication transceiver comprising at least one transmitter/receiver pair wherein front-end mismatches occur. The method requires the use of amongst other things a splitter, a directional coupler, a calibration noise source and a power splitter. The method introduces some matching requirement on the calibration hardware, which is to be minimized.

European patent application EP1496567-A1 relates to an arrangement for calibrating transmission and/or reception of signals in a radio communication system. The arrangement comprises a number of transceiving means each connected to an antenna element, a coupling network arranged between the transceiving means and the antenna elements and connected to calibration transmitting and/or receiving means that feed test signals to and/or receive the test signals from the coupling network, a calibration processor for determining variations of the test signals in the transceiving means, and a beamforming processor that takes into account the variations for beamforming and/or determines the arrival direction of transceived radio signals.

SUMMARY OF CERTAIN INVENTIVE ASPECTS

Certain inventive aspects relate to a circuit and method for calibrating MIMO systems which is simple and avoids the use of a calibration transmit/receive pair.

One inventive aspect relates to a calibration circuit comprising
  at least a first and a second input/output port, each arranged for being connected to a different transmitter/receiver pair of a MIMO system,
  at least a third and a fourth input/output port, each arranged for being connected to a different antenna,
characterized in that it further comprises
  an attenuator having a first attenuator port and a second attenuator port, and
  a first and a second non-reciprocal switch, the first switch being arranged for establishing a connection between the first input/output port and either the third input/output port or the first attenuator port, and the second switch arranged for establishing a connection between the second input/output port and either the fourth input/output port or the second attenuator port.

In a preferred embodiment the first and second switch and the attenuator are such that the transfer function of the connection of the first switch to the first attenuator port and via the second attenuator port to the second switch is essentially equal to the transfer function of the connection of the second switch to the second attenuator port and via the first attenuator port to the first switch.

Another inventive aspect relates to a system comprising a calibration circuit as above described and at least two transmitter/receiver pairs of the MIMO system.

Another inventive aspect relates to a method for determining a measure of the relative analogue front end mismatch of at least two transmit/receive pairs of a MIMO system, comprising:
  selecting one transmitter/receiver pair as a reference,
  transmitting a known test signal from the reference transmitter to the receiver of a second transmitter/receiver pair and determining a corresponding first transfer function,
  transmitting the known test signal from the transmitter of the second transmitter/receiver pair to the reference receiver and determining a corresponding second transfer function,
  determining from the first and second transfer function the measure of relative mismatch.

Advantageously the method further comprises multiplying a signal to be fed to the transmitter of the second transmitter/receiver pair with the measure of relative mismatch.

In an embodiment with a multicarrier system the method are preferably applied for each individual subcarrier of the multicarrier system.

In a specific embodiment the known test signal is a BPSK IEEE 802.11a long training symbol.

BRIEF DESCRIPTION OF THE DRAWINGS

FIG. 1 represents the single-user MIMO downlink system structure.

FIG. 2 represents some non-ideal effects in a transmitter front-end.

FIG. 3 represents a calibration scheme from the prior art.

DETAILED DESCRIPTION OF CERTAIN ILLUSTRATIVE EMBODIMENTS

Figure 4:
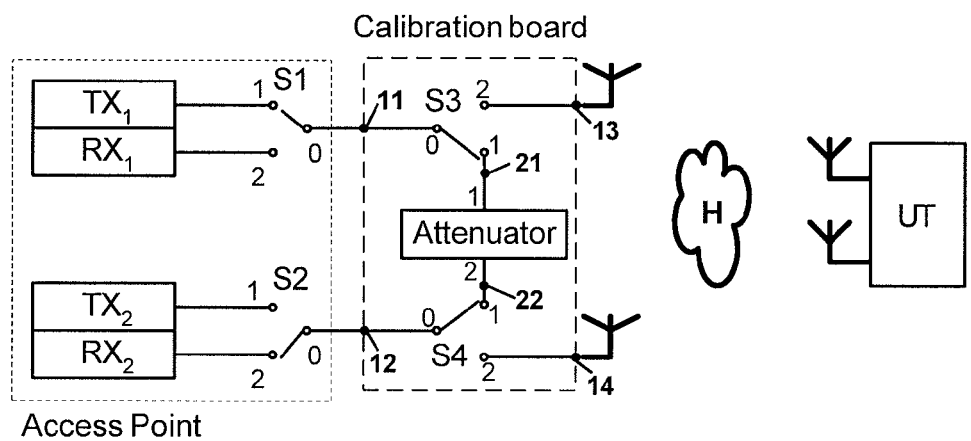
FIG. 4 represents a calibration scheme according to one embodiment.

The calibration scheme according to one embodiment is shown in FIG. 4. The analogue FE mismatch calibration procedure is performed before the downlink transmission. The calibration procedure includes measuring the calibration factors and applying the calibration factors.

In a first process the calibration factor measurement procedure is performed. One pair of data transmitter/receiver is taken as a reference. If $TX_1$ and $RX_1$ are the reference, then coefficient $c_1=1$. A known test signal (e.g. the BPSK long training symbol in standard IEEE 802.11a) is transmitted during the $c_2$ measurement. Suppose $s_1$ is the BPSK signal transmitted by $TX_1$, $s_2$ is the BPSK signal transmitted by $TX_2$. A kind of cross transmission is applied, wherein $TX_1$ transmits to $RX_2$ and $TX_2$ transmits to $RX_1$. In the frequency domain the received signals at the $RX_1$ and $RX_2$ are then given by Step 1: $TX_1 \Rightarrow RX_2$, the received signal at $RX_2$ is $$r2 = TX_1 \cdot S3_{0 \to 1} \cdot A_{1 \to 2} \cdot S4_{1 \to 0} \cdot RX_2 \cdot s1 + RX_2 \cdot n2 \quad \text{(eq.6)}$$

Step 2: $TX_2 \Rightarrow RX_1$, the received signal at $RX_1$ is $$r1 = TX_2 \cdot S4_{0 \to 1} \cdot A_{2 \to 1} \cdot S3_{1 \to 0} \cdot RX_1 \cdot s2 + RX_1 \cdot n1 \quad \text{(eq.7)}$$

whereby n1 and n2 the additive white Gaussian noise (AWGN) contribution at the input of RX1 and RX2. A denotes the attenuation of the attenuator, $A_{1 \to 2}$ and $A_{2 \to 1}$ denote the attenuation from the first port (21) to the second port (22) and from the second port (22) to the first (21), respectively. Note that the switches S3, S4 are non-reciprocal, i.e. $S3_{0 \to 1} \neq S3_{1 \to 0}$, for example.

From Eqs. 6-7 the transfer function (i.e. the frequency response) can be derived $$TF1 = \frac{r2}{s1} = TX_1 \cdot S3_{0 \to 1} \cdot A_{1 \to 2} \cdot S4_{1 \to 0} \cdot RX_2 + RX_2 \cdot \frac{n2}{s1} \quad \text{(eq. 8)}$$

$$TF2 = \frac{r1}{s2} = TX_2 \cdot S4_{0->1} \cdot A_{2->1} \cdot S3_{1->0} \cdot RX_1 + RX_1 \cdot \frac{n1}{s2} \quad \text{(eq. 9)}$$

This cross transmission can be done in different time slots (time-division). The TDD switches S1 and S2 are part of the AP TXs and RXs, so they are not shown explicitly in Eqs. (6) to (9).

By sending the known test signal multiple times and take the average of the derived transfer functions, the impact of AWGN factor in (8) and (9) can be averaged out. Hence, the frequency response of the transmission chain converges towards $$TF1 \approx TX_1 \cdot S3_{0->1} \cdot A_{1->2} \cdot S4_{1->0} \cdot RX_2 \quad \text{(eq.10)}$$

$$TF2 \approx TX_2 \cdot S4_{0->1} \cdot A_{2->1} \cdot S3_{1->0} \cdot RX_1 \quad \text{(eq.11)}$$

The attenuator in FIG. 4 is needed to make sure that during the calibration factor measurement, the received signal power at the RXs is low enough, so that the low noise amplifiers (LNAs) in the RXs are not saturated. In scheme of FIG. 3 the directional couplers typically bring about 20 dB insertion loss, while additionally a 6 dB attenuator is applied at each of the three ports of the power combiner/divider in the implementation.

The calibration factor should be measured at all the possible Automatic Gain Control (AGC) setting couples at RX1 and RX2. Certainly for AGC couples [RX1, RX2] with high enough power, e.g., [−20 dBm, −20 dBm], the operation of averaging out the AWGN is not really necessary. However, in order to simplify the implementation, an averaging operation is performed on all the AGC couples.

A division operation can be applied on (10) and (11), yielding $$c2 = \frac{TF1}{TF2} = \frac{TX_1 \cdot S3_{0->1} \cdot A_{1->2} \cdot S4_{1->0} \cdot RX_2}{TX_2 \cdot S4_{0->1} \cdot A_{2->1} \cdot S3_{1->0} \cdot RX_1} \quad \text{(eq. 12)}$$

This leads to $$c2 \cdot \frac{TX_2}{RX_2} = \frac{S3_{0->1} \cdot A_{1->2} \cdot S4_{1->0}}{S4_{0->1} \cdot A_{2->1} \cdot S3_{1->0}} \cdot \frac{TX_1}{RX_1} \quad \text{(eq. 13)}$$

If the condition $$\frac{S3_{0->1} \cdot A_{1->2} \cdot S4_{1->0}}{S4_{0->1} \cdot A_{2->1} \cdot S3_{1->0}} \approx 1 \quad \text{(eq. 14)}$$

is satisfied within enough accuracy, then $$c2 \cdot \frac{TX_2}{RX_2} \approx \frac{TX_1}{RX_1} \quad \text{(eq. 15)}$$

is also fulfilled within enough accuracy. Therefore, the design criterion for achieving satisfactory calibration accuracy is decided by the accuracy of (eq. 14).

To summarize, one embodiment of the calibration scheme avoids the use of calibration transceiver by taking one pair of the signal transceiver as the reference and applying cross transmission on the known signaling during calibration factor measurement.

Figure 5:
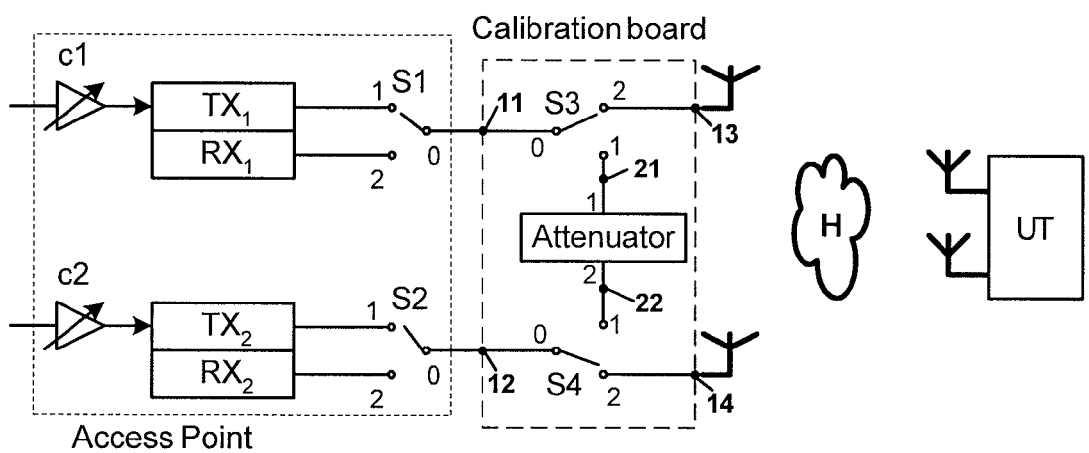
FIG. 5 represents the application of the calibration factors in the downlink transmission.

In a next process the calibration factors are applied into the MIMO downlink transmission. The measured calibration factor $[c_1=1, c_2]$ will be applied into the downlink data transmission, at the positions shown in FIG. 5. In FIG. 5 the switching positions of the switches S1 to S4 have been changed accordingly for the downlink transmission. The attenuator now is isolated from the signal path by the two switches S3 and S4. $S3_{0<->2}$ and $S4_{0<->2}$ are common to the transmit path and receive path, they don't introduce extra non-reciprocity.

Figure 6:
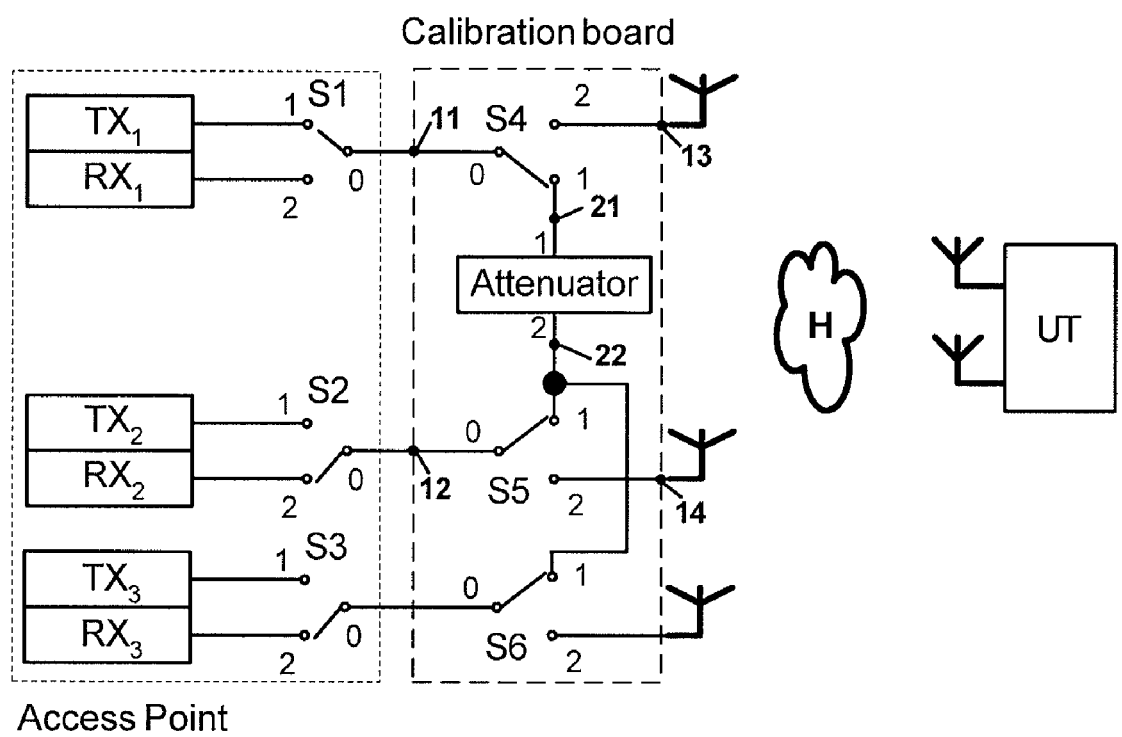
FIG. 6 represents an extension of one embodiment of the scheme to more than two antennas.

The calibration scheme according to one embodiment can easily be extended to more than two AP antennas, as opposed to the complexity to extend the older scheme to more than two AP antennas. In FIG. 6, the calibration factor measurement for three AP antennas follows four steps:

Step 1: $TX_1 => RX_2$, which gives transfer function TF1;
Step 2: $TX_1 => RX_3$, which gives TF2;
Step 3: $TX_2 => RX_1$, which gives TF3; and
Step 4: $TX_3 => RX_1$, which gives TF4

One obtains:

$$TF1 \approx TX_1 \cdot S4_{0->1} \cdot A_{1->2} \cdot S5_{1->0} \cdot RX_2 \quad \text{(eq.16)}$$

$$TF2 \approx TX_1 \cdot S4_{0->1} \cdot A_{1->2} \cdot S6_{1->0} \cdot RX_3 \quad \text{(eq.17)}$$

$$TF3 \approx TX_2 \cdot S5_{0->1} \cdot A_{2->1} \cdot S4_{1->0} \cdot RX_1 \quad \text{(eq.18)}$$

$$TF4 \approx TX_3 \cdot S6_{0->1} \cdot A_{2->1} \cdot S4_{1->0} \cdot RX_1 \quad \text{(eq.19)}$$

The calibration factors $c_2$ and $c_3$ can then be derived as $$c2 = \frac{TF1}{TF3} = \frac{S4_{0->1} \cdot A_{1->2} \cdot S5_{1->0}}{S5_{0->1} \cdot A_{2->1} \cdot S4_{1->0}} \cdot \frac{TX_1 \cdot RX_2}{TX_2 \cdot RX_1} \quad \text{(eq. 20)}$$

$$c3 = \frac{TF2}{TF4} = \frac{S4_{0->1} \cdot A_{1->2} \cdot S6_{1->0}}{S6_{0->1} \cdot A_{2->1} \cdot S4_{1->0}} \cdot \frac{TX_1 \cdot RX_3}{TX_3 \cdot RX_1} \quad \text{(eq. 21)}$$

The final matching accuracy depends on the accuracy of $$\frac{S4_{0->1} \cdot A_{1->2} \cdot S5_{1->0}}{S5_{0->1} \cdot A_{2->1} \cdot S4_{1->0}} \approx 1 \quad \text{(eq. 22)}$$

$$\frac{S4_{0->1} \cdot A_{1->2} \cdot S6_{1->0}}{S6_{0->1} \cdot A_{2->1} \cdot S4_{1->0}} \approx 1 \quad \text{(eq. 23)}$$

Now a comparison is provided between the present calibration scheme and that of FIG. 3. The working principle of the calibration method in FIG. 3 is that four TFs are measured and two calibration factors c1 and c2 are derived from the four TFs.

$$TF1 \approx TX_1 \cdot CPL1_{in->cpl} \cdot CD_{in1->out} \cdot RXC \quad \text{(eq.24)}$$

$$TX2 \approx TX_2 \cdot CPL2_{in->cpl} \cdot CD_{in2->out} \cdot RXC \quad \text{(eq.25)}$$

$$TF3 \approx TXC \cdot CD_{out->in1} \cdot CPL1_{cpl->in} \cdot RX_1 \quad \text{(eq.26)}$$

$$TX4 \approx TXC \cdot CD_{out->in2} \cdot CPL2_{cpl->in} \cdot RX_2 \quad \text{(eq.27)}$$

The calibration factors for the scheme of FIG. 3 can be derived as $$c1 = \frac{TF3}{TF1} = \frac{TXC \cdot CPL1_{cpl->in} \cdot CD_{out->in1} \cdot RX_1}{TX_1 \cdot CPL1_{in->cpl} \cdot CD_{in1->out} \cdot RXC} \quad \text{(eq. 28)}$$

-continued $$c2 = \frac{TF4}{TF2} = \frac{TXC \cdot CPL2_{cpl->in} \cdot CD_{out->in2} \cdot RX_2}{TX_2 \cdot CPL2_{in->cpl} \cdot CD_{in2->out} \cdot RXC} \quad (eq. 29)$$

or $$c1 \cdot \frac{TX_1}{RX_1} = \frac{CPL1_{cpl->in} \cdot CD_{out->in1}}{CPL1_{in->cpl} \cdot CD_{in1->out}} \cdot \frac{TXC}{RXC} = \beta_1 \cdot \frac{TXC}{RXC} \quad (eq. 30)$$

$$c2 \cdot \frac{TX_2}{RX_2} = \frac{CPL2_{cpl->in} \cdot CD_{out->in2}}{CPL2_{in->cpl} \cdot CD_{in2->out}} \cdot \frac{TXC}{RXC} = \beta_2 \cdot \frac{TXC}{RXC} \quad (eq. 31)$$

The design criterion in the scheme of FIG. 3 is to ensure $$\beta_1 = \beta_2 \quad (eq.32)$$

as accurately as possible. It needs to be emphasized that the calibration accuracy doesn't depend on the reciprocity of the separate calibration components on the calibration board, but depends on the accuracy of (14) and (32), for the new and older calibration schemes respectively. The accuracy of (14) or (32) can be checked by measuring the $S_{12}$ and $S_{21}$ parameters of the components on the calibration board, at any desired frequency.

An example is given for measurement results at 5.25 GHz. With the scheme of FIG. 3 one finds $\beta_1$ having an amplitude of 0.93 and phase 2.4° and $\beta_2$ having amplitude of 0.93 and phase 1.1°. For the scheme according to one embodiment, the expression of (eq. 14) has an amplitude of 1 and phase 0.5°. Assuming the AWGN impact has been averaged out, the prior art scheme has a calibration accuracy within 1°, whereas the scheme of one embodiment has a calibration accuracy within 0.5°. By selecting the components on the calibration board properly, the calibration accuracy can be controlled. Except for the difference in matching accuracy, the new scheme has equivalent performance to that of the prior art scheme from an implementation point of view.

When a MIMO scheme is considered wherein only transmit processing is applied, the calibration procedure is MIMO processing independent. When a MIMO scheme is considered with joint transmit-receive processing is considered, the calibration must be performed both at the transmitter side and the receiver side.

When comparing the scheme of one embodiment to that of FIG. 3, two of the main improvements can be noticed:
the use of the calibration TX and RX is avoided
the calibration board now is simpler, because the bulky directional couplers and combiner/divider are replaced by switches and an attenuator.

The calibration as in the foregoing embodiments can applied to a plurality of wireless communication systems: low-mobility wireless systems like Wireless Personal Area Network (WPAN), Wireless Metropolitan Area Network (WMAN), and Wireless Local Area Network (WLAN), for OFDM or single carrier communication systems over flat fading channel, . . . . Note that in case of a multicarrier (OFDM) system the calibration method is performed on a carrier-per-carrier basis.

Figure 7:
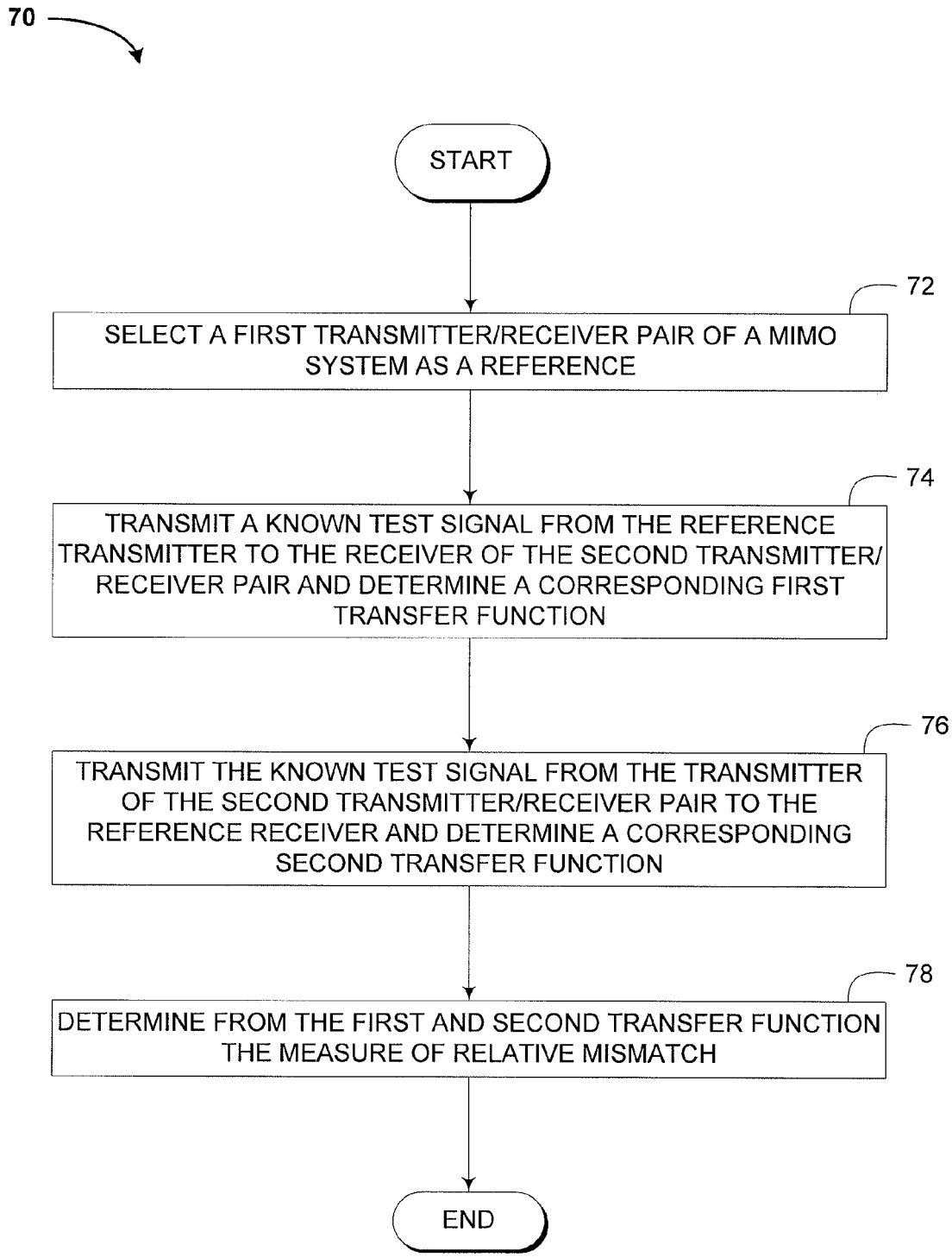
FIG. 7 shows a flowchart of one embodiment of a method of determining a measure of the relative analogue front end mismatch of at least a first and second transmit/receive pairs of a multiple input multiple output (MIMO) system.

FIG. 7 shows a flowchart of one embodiment of a method of determining a measure of the relative analogue front end mismatch of at least a first and second transmit/receive pairs of a multiple input multiple output (MIMO) system. The method 70 starts at a block 72, wherein a first transmitter/receiver pair of a MIMO system is selected as a reference. The method then moves to a block 74, wherein a known test signal is transmitted from the reference transmitter to the receiver of the second transmitter/receiver pair and a corresponding first transfer function is determined. Moving to a block 76, the known test signal is transmitted from the transmitter of the second transmitter/receiver pair to the reference receiver and a corresponding second transfer function is determined. Next at a block 78, the measure of relative mismatch is determined from the first and second transfer function.

Although systems and methods as disclosed, is embodied in the form of various discrete functional blocks, the system could equally well be embodied in an arrangement in which the functions of any one or more of those blocks or indeed, all of the functions thereof, are realized, for example, by one or more appropriately programmed processors or devices.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being redefined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. A calibration circuit comprising:
   at least a first and a second input/output port, each arranged for being connected to a different transmitter/receiver pair of a multiple input multiple output (MIMO) system;
   at least a third and a fourth input/output port, each arranged for being connected to a different antenna;
   an attenuator having a first attenuator port and a second attenuator port;
   a first and a second non-reciprocal switch, the first switch being arranged for establishing a connection between the first input/output port and either the third input/output port or the first attenuator port, and the second switch arranged for establishing a connection between the second input/output port and either the fourth input/output port or the second attenuator port.

2. The circuit of claim 1, wherein a transfer function of the connection of the first switch to the first attenuator port and via the second attenuator port to the second switch is substantially equal to a transfer function of the connection of the second switch to the second attenuator port and via the first attenuator port to the first switch.

3. A system comprising a calibration circuit of claim 1, further comprising at least two transmitter/receiver pairs of the MIMO system.

4. A method of determining a measure of a relative analogue front end mismatch of at least a first and second transmit/receive pairs of a multiple input multiple output (MIMO) system, the method comprising:
   selecting a first transmitter/receiver pair of a MIMO system as a reference;
   transmitting a known test signal from the reference transmitter to the receiver of the second transmitter/receiver pair and determining a corresponding first transfer function;

transmitting the known test signal from the transmitter of the second transmitter/receiver pair to the reference receiver and determining a corresponding second transfer function; and determining from the first and second transfer function the measure of a relative analogue front end mismatch.

5. The method of claim 4, further comprising multiplying a signal to be fed to the transmitter of the second transmitter/receiver pair with the determined measure of relative mismatch.

6. The method of claim 4, wherein the method is applied to each individual subcarrier of a multicarrier system.

7. The method of claim 4, wherein the known test signal is a BPSK IEEE 802.11a long training symbol.

8. The method of claim 4, wherein the first transmitter/receiver pair is different from the second transmitter/receiver pair.

9. A device for determining a measure of a relative analogue front end mismatch of at least a first and second transmit/receive pairs of a multiple input multiple output (MIMO) system, the device comprising:

means for selecting a first transmitter/receiver pair of a MIMO system as a reference;

means for transmitting a known test signal from the reference transmitter to the receiver of the second transmitter/receiver pair and determining a corresponding first transfer function;

means for transmitting the known test signal from the transmitter of the second transmitter/receiver pair to the reference receiver and determining a corresponding second transfer function; and means for determining from the first and second transfer function the measure of relative mismatch.

10. The device of claim 9, wherein the first transmitter/receiver pair is different from the second transmitter/receiver pair.

11. The device of claim 9, further comprising means for multiplying a signal to be fed to the transmitter of the second transmitter/receiver pair with the determined measure of relative mismatch.

12. The device of claim 9, wherein the known test signal is a BPSK IEEE 802.11a long training symbol.

* * * * *